United States Patent
Baumback et al.

(10) Patent No.: US 7,930,393 B1
(45) Date of Patent: *Apr. 19, 2011

(54) MONITORING DOMAIN ALLOCATION PERFORMANCE

(75) Inventors: Mark S. Baumback, Seattle, WA (US); David William Bettis, Seattle, WA (US); Jonathan A. Jenkins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/240,863

(22) Filed: Sep. 29, 2008

(51) Int. Cl.
  *G06F 15/173* (2006.01)
(52) U.S. Cl. .................... 709/224; 709/226; 709/203
(58) Field of Classification Search .................. 709/224, 709/223, 203, 226
  See application file for complete search history.

(56) References Cited

U.S. PATENT DOCUMENTS

| | | | |
|---|---|---|---|
| 7,065,496 B2 | 6/2006 | Subbloie et al. | |
| 7,085,825 B1 | 8/2006 | Pishevar et al. | |
| 7,269,657 B1 * | 9/2007 | Alexander et al. | 709/226 |
| 7,343,399 B2 * | 3/2008 | Hayball et al. | 709/219 |
| 7,581,224 B2 * | 8/2009 | Romero | 709/224 |
| 7,748,005 B2 * | 6/2010 | Romero et al. | 709/226 |
| 2004/0064558 A1 * | 4/2004 | Miyake | 709/226 |
| 2005/0273507 A1 * | 12/2005 | Yan et al. | 709/223 |
| 2006/0209701 A1 | 9/2006 | Zhang et al. | |
| 2008/0183721 A1 | 7/2008 | Bhogal et al. | |

* cited by examiner

*Primary Examiner* — Philip B Tran
(74) *Attorney, Agent, or Firm* — Knobbe Martens Olson & Bear LLP

(57) ABSTRACT

Systems and methods for monitoring the performance associated with fulfilling resource requests and determining optimizations for improving such performance are provided. A processing device obtains and processes performance metric information associated with processing a request corresponding to two or more embedded resources. The processing device uses the processed performance metric information to determine an allocation of one or more domains to be associated with the two or more embedded resources. In some embodiments, in making such a determination, the processing device assesses performance metric information collected and associated with subsequent requests for the two or more embedded resources using each of a variety of alternative allocations of domains associated with the two or more embedded resources. The processing device may also consider a number of factors, including domain selection criteria obtained from an original content provider. Aspects of systems and methods for generating recommendations to use a particular allocation of domains to process a subsequent request corresponding to the two or more embedded resources are also provided.

46 Claims, 12 Drawing Sheets

MONITORING DOMAIN ALLOCATION PERFORMANCE

BACKGROUND

Generally described, computing devices and communication networks may be utilized to exchange information. In a common application, a computing device may request content from another computing device via a communication network. For example, a user at a personal computing device may utilize a browser application to request a web page from a server computing device via the Internet. In such embodiments, the user computing device may be referred to as a client computing device and the server computing device may be referred to as a content provider.

Content providers are generally motivated to provide requested content to client computing devices often with consideration of efficient transmission of the requested content to the client computing device and/or consideration of a cost associated with the transmission of the content. Additionally, the content requested by the client computing devices may have a number of components, which may require further consideration of latencies associated with delivery of the individual components as well as the originally requested content as a whole.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser application, typically processes embedded resource identifiers to generate requests for the content. Often the resource identifiers associated with the embedded resource reference a computing device associated with the content provider such that the client computing device would transmit the request for the additional resources to the referenced computing devices. Accordingly, in order to satisfy a content request, the content provider(s) (or any service provider on behalf of the content provider(s)) would provide client computing devices data associated with the Web page and/or data associated with the embedded resources.

Traditionally, a number of methodologies exist which measure the performance associated with the exchange of data such as in the environment described above. For example, some methodologies provide for limited measurement of performance metrics associated with network side processing of a content request. Other methodologies allow for limited measurement of performance metrics associated with the content request measured from the browser side.

BRIEF DESCRIPTION OF THE DRAWINGS

Many of the attendant advantages and aspects of the present disclosure will become more readily appreciated as the same become better understood by reference to the following detailed description, when taken in conjunction with the accompanying drawings, wherein.

DETAILED DESCRIPTION

Figure 1:
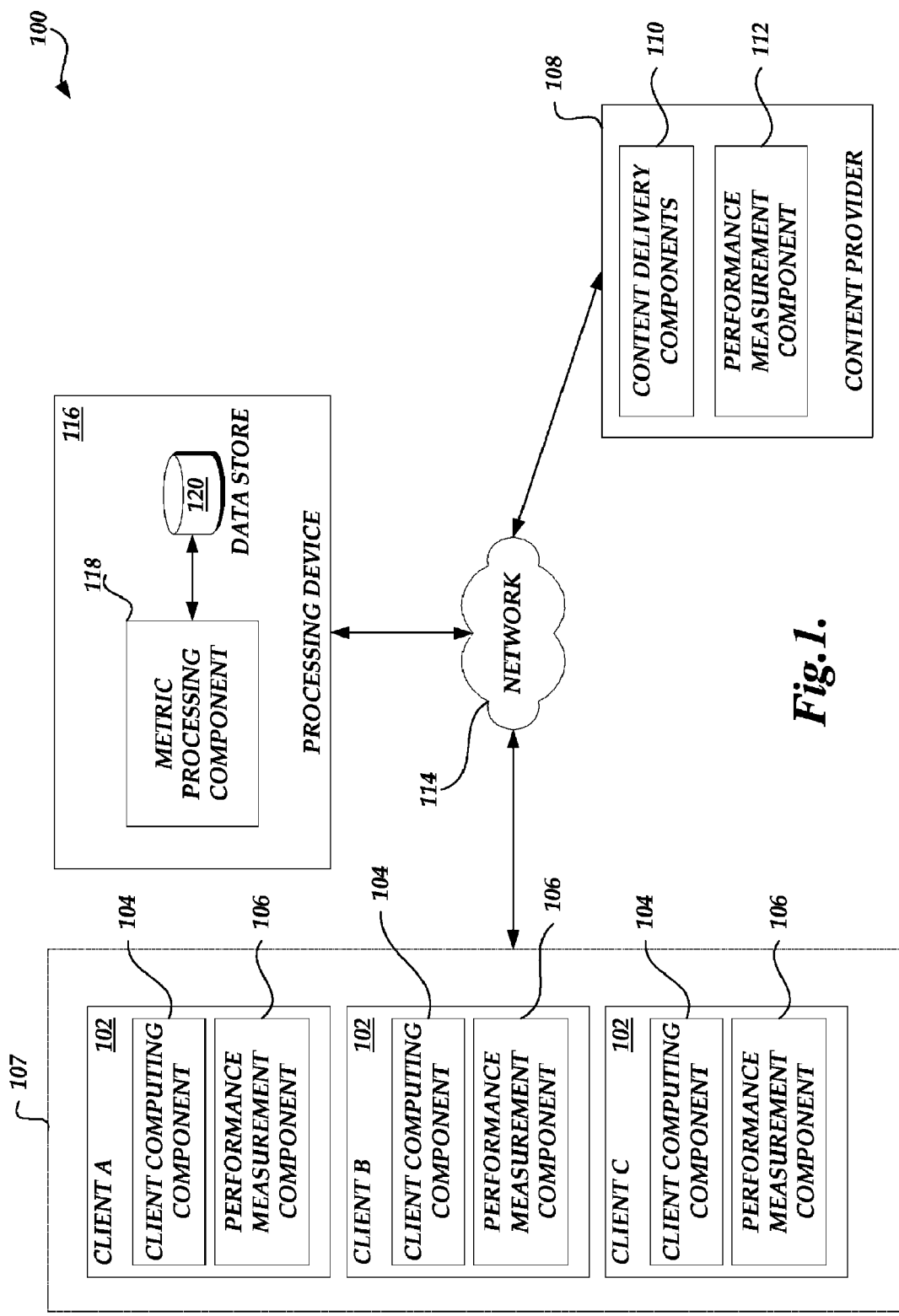
FIG. 1 is a block diagram illustrative of a performance measurement system including a number of client computing devices, a content provider, and a processing device.

Generally described, the present disclosure is directed to monitoring the performance and processing of data exchanges between client computing devices and server computing devices. Specifically, aspects of the disclosure will be described with regard to monitoring a data exchange involving a request by a client computing device for an original resource and two or more corresponding embedded resources and dynamically identifying one or more sets of domains to be utilized in conjunction with processing a subsequent request corresponding to the two or more embedded resources. Performance data can then be used to assess performance related to the processing of the various client requests for the original and corresponding embedded resources. Additionally, the processed performance data can be used to determine whether to recommend a particular allocation of domains to be associated with the embedded resources for improving performance of subsequent client requests for the original and embedded resources.

Traditionally, network servers can collect latency information associated with a server's processing of a client request for a resource. For example, network servers can measure a time associated with processing an incoming client request, identifying/obtaining the requested resource, and initiating the transmission of the resource responsive to the client request. Additionally, client computing devices can collect latency information associated with the client computing device's initiation of a resource request and receipt of the resource responsive to the request. Aspects of the present disclosure, which will be described further below, are directed to identifying and providing additional information to improve the performance assessment related to the processing of a client request for one or more resources and to dynamically identifying and evaluating modifications to the original request, original resource, and/or any embedded resources.

Even further, traditionally, client computing device hardware and software, including browsers, operating systems, network stacks, and routers, may be configured to limit or otherwise restrict network traffic according to set rules. For example, Web browsers may attempt to place limits on the number of simultaneous connections that may be initiated by or maintained between the browser and any particular content provider computing device. In many browsers, connections may be limited by domain name, such that, for example, a client computing device may maintain a threshold number of simultaneous connections to a given domain name. In accordance with further aspects of the present disclosure, which will also be described further below, the performance assessment associated with processing resource requests will take such limitations or restrictions into consideration. Although various aspects of the disclosure will be described with regard to illustrative examples and embodiments, one skilled in the art will appreciate that the disclosed embodiments and examples should not be construed as limiting.

FIG. 1 is a block diagram illustrative of a performance measurement system 100 for monitoring the performance and processing of data exchanges. As illustrated in FIG. 1, the performance measurement system 100 includes a number of client computing devices 102 (generally referred to as clients) for requesting content from a content provider. As illustrated in FIG. 1, each client computing device 102 includes a client computing component 104 for requesting content from network resources in the form of an originally requested resource that may include identifiers to two or more embedded resources that need to be requested. As will be described in greater detail below, the client computing component 104 also identifies performance metrics obtained by client computing devices and/or components, such as browser software applications. Additionally, the client computing device 102 includes a performance measurement component 106 that identifies additional performance metrics associated with the client request, such as network level performance data including, for example, timing of receipt of first and last network packets of data for fulfilling the original resource request and each embedded resource request. In one embodiment, the performance measurement component 106 works in conjunction with the client computing component 104 to collect performance metric information such as from an operating system or a data file.

As illustrated in FIG. 1, the client computing component 104 and performance measurement component 106 are executed on each client computing device 102. Alternatively, the client computing component 104 may not be configured, or is otherwise incapable of, obtaining or providing some or all of the performance metric information described herein. In such an embodiment, the client computing component 104 may function with a reduced or limited capacity. In still a further embodiment, the client computing component 104 may function in conjunction with a separate communication software application (e.g., a browser software application) to provide the combined functionality described for the client computing component 104. For example, the client computing component could correspond to a stand alone software application, plugin, script, and the like. Additionally, although each client computing device 102 is illustrated as having a separate performance measurement component 106, in an alternative embodiment, the performance measure component 106 may be shared by one or more client computing devices.

In an illustrative embodiment, the client computing devices 102 may correspond to a wide variety of computing devices including personal computing devices, laptop computing devices, hand-held computing devices, terminal computing devices, mobile devices, wireless devices, various electronic devices and appliances and the like. As also illustrated in FIG. 1, the client computing devices 102 are considered to be logically grouped, as represented generally by client 107, regardless of whether the client computing devices are physically separate and geographically distributed throughout the communication network 114. In this regard, the client computing devices 102 may each communicate directly or indirectly with other computing devices over network 114, such as a wide area network or local network. Additionally, one skilled in the relevant art will appreciate that client 107 can be associated with various additional computing devices/components including, but not limited to, content and resource administrative components, DNS resolvers, scheduling devices/components, and the like.

Each of the client computing devices 102 can accordingly include necessary hardware and software components for establishing communications over the network 114. For example, the client computing devices 102 may include networking components and additional software applications that facilitate communications via the Internet or an intranet. As previously described, the client computing device 102 may include an additional, separate browser software application. The client computing devices 102 may also be associated with, or otherwise include, other computing components, such as proxy applications, for further facilitating communications via the Internet or an intranet. As previously described, the client computing components 104 may each function as a browser software application for requesting content from a network resource. Additionally, in an illustrative embodiment, the performance measurement component 106 of the client computing device 102 may function as a proxy application for managing browser application content requests to the network resource. In other embodiments, the client computing devices 102 may be otherwise associated with an external proxy application, as well as any other additional software applications or software services, used in conjunction with requests for content.

With continued reference to FIG. 1 and as set forth generally above, the performance measurement system 100 may include a content provider 108 in communication with the one or more client computing devices 102 via the communication network 114. The content provider 108 may include a number of content delivery components 110, such as a Web server component and associated storage component corresponding to one or more server computing devices for obtaining and processing requests for content (such as Web pages) from the client computing devices 102. The content provider 108 can further include a performance measurement component 112 for measuring performance metrics, such as a time associated with processing an incoming client request, identifying/obtaining the requested resource, and initiating the transmission of the resource responsive to the client request. One skilled in the relevant art will appreciate that the content provider 108 can include or otherwise be associated with various additional computing resources, including, but not limited to, additional computing devices for administration of content and resources, DNS name servers, interfaces for obtaining externally provided content (e.g., advertisements, Web services, etc.), and the like. Although the performance measurement system 100 is illustrated in a client-server configuration, one skilled in the relevant art will appreciate that the performance measurement system 100 may be implemented in a peer-to-peer configuration as well.

With yet further continued reference to FIG. 1, the performance measurement system 100 may further include a processing device 116 for collecting and aggregating performance data related to the processing of client requests. The processing device 116 can also be used to assess the collected performance data and to determine if modifications to the original resource and/or embedded resources should be made to improve performance for subsequent client requests for the original resource and/or embedded resources.

As illustrated in FIG. 1, the processing device 116 is in communication with the one or more client computing devices 102 and the content provider 108 via communication network 114. Additionally, as will be further described below, the processing device 116 may include a metric processing component 118 for the collection and aggregation of performance data from the client computing devices 102 and content provider 108, or any other computing devices, as well as for the assessment of performance data. Specifically, in one embodiment, the client computing components 104 and performance measurement components 106 associated with client computing devices 102 provide performance metric information to the metric processing component 118, while the performance measurement component 112 of the content provider 108 provides performance metric information to the metric processing component 118. The processing device 116 may further include a local data store 120 for storing the received performance data. It will be appreciated by one skilled in the art and others that metric processing component 118 and data store 120 may correspond to multiple devices/components and/or may be distributed.

One skilled in the relevant art will also appreciate that the components and configurations provided in FIG. 1 are illustrative in nature. Accordingly, additional or alternative components and/or configurations, especially regarding additional components, systems and subsystems for facilitating communications may be utilized.

Figure 2:
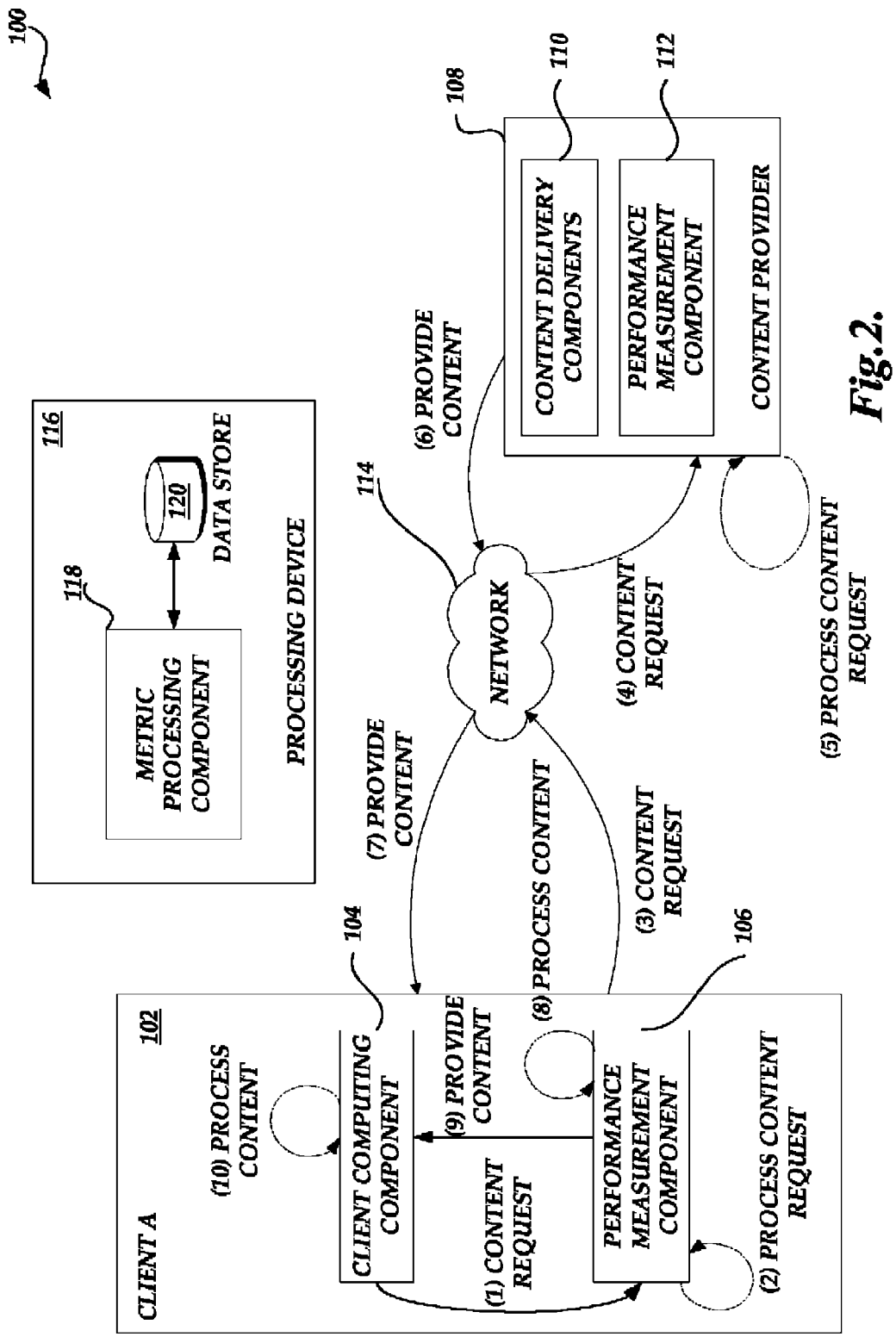
FIG. 2 is a block diagram of the performance measurement system of FIG. 1 illustrating the process of monitoring and fulfilling resource requests.
Figure 3:
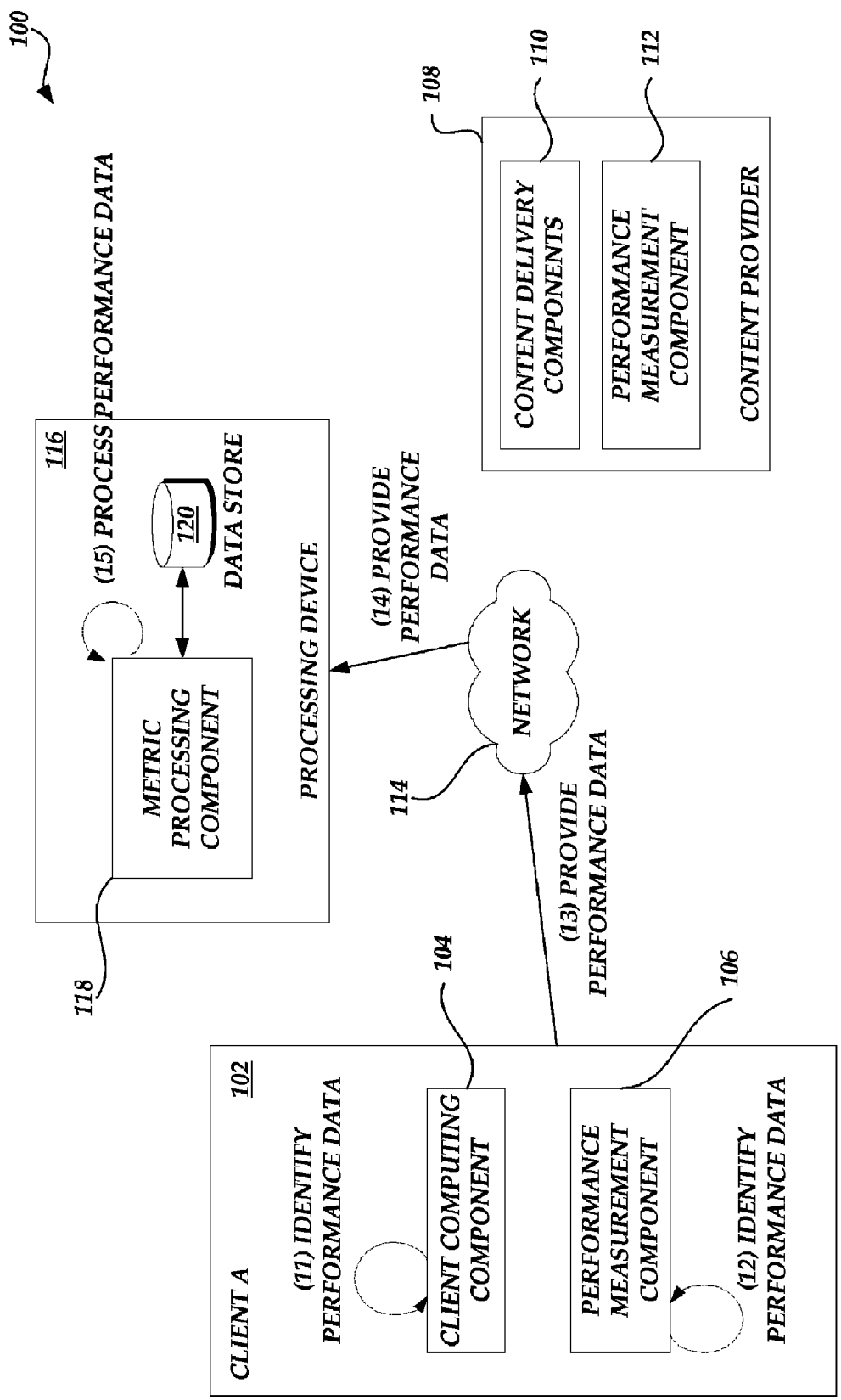
FIG. 3 is a block diagram of the performance measurement system of FIG. 1 illustrating the process of identifying and providing performance metric information from a client computing device.
Figure 4:
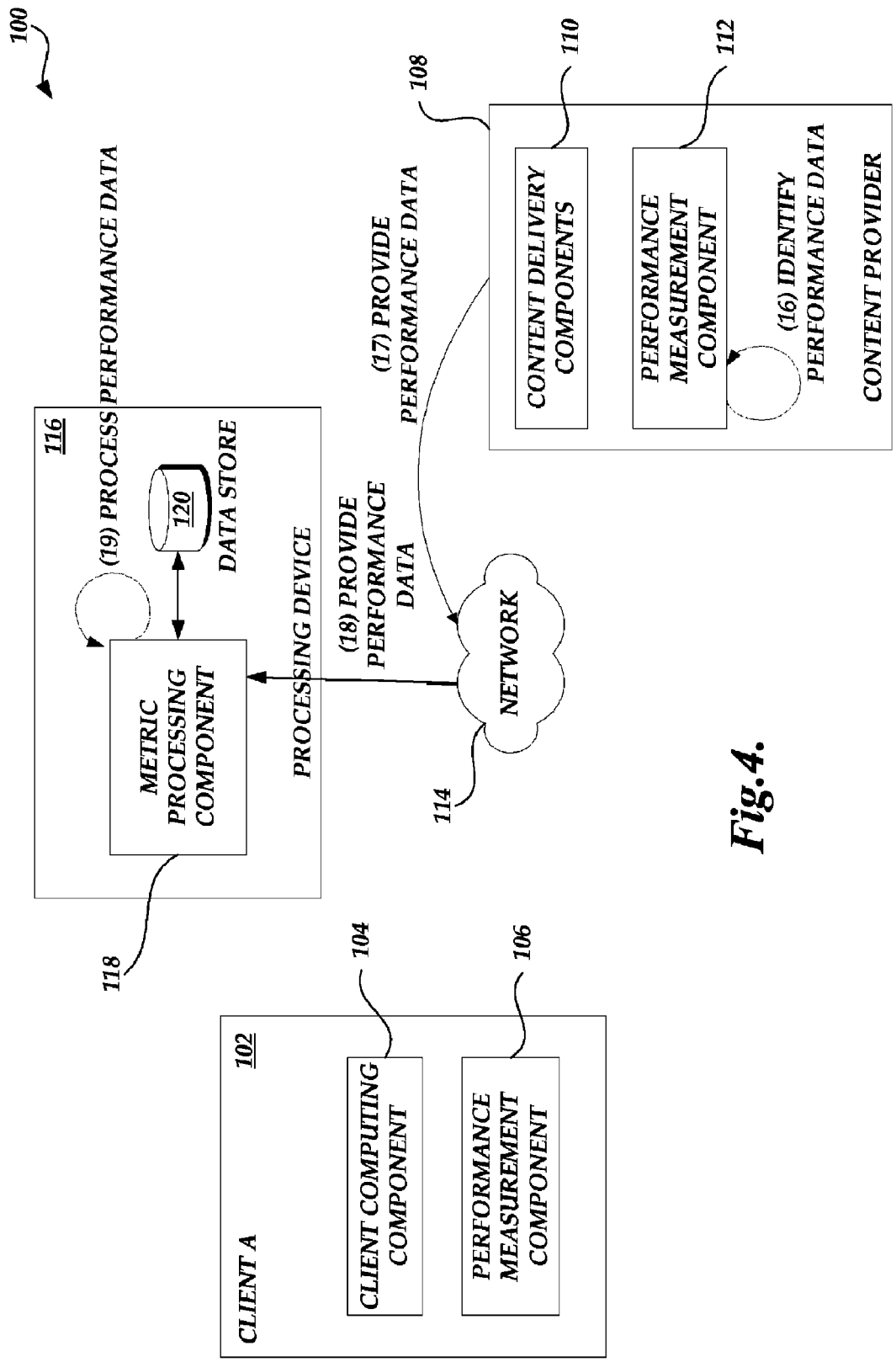
FIG. 4 is a block diagram of the performance measurement system of FIG. 1 illustrating the process of identifying and providing performance metric information from a content provider.

With reference now to FIGS. 2-4, an illustrative example of the operation of the performance monitoring system 100 according to some embodiments will be described. For purposes of the example, however, the illustration has been simplified such that many of the components utilized to facilitate communications are not shown. One skilled in the relevant art will appreciate that such components may be utilized and that additional interactions would accordingly occur without departing from the spirit and scope of the present disclosure.

With reference to FIG. 2, a client computing component 104 initiates a content request that is intended to ultimately be received and processed by the content provider 108. In an illustrative embodiment, the requested content may correspond to a Web page that is displayed on the client computing device 102 via the processing of a base set of information, such as hypertext markup language ("HTML"), extensible markup language ("XML"), and the like. The base set of information may also include a number of embedded resource identifiers that corresponds to resource objects that should be obtained by the client computing device 102 as part of the processing of the requested content. The embedded resource identifiers may be generally referred to as resource identifiers or resource URLs. The request for the base set of information and the subsequent request(s) for any embedded resources may be referred to generally as a "resource request."

In one embodiment, prior to initiating a resource request, the client computing component 104 associates a record identifier with the resource request. As will be described further below, the record identifier may be used to track performance metrics associated with processing the requested resource and any embedded resources. In one example, the record identifier may be attached to the resource request as a header or otherwise embedded in the request. The client computing component 104 then transmits the resource request with the record identifier. However, as will also be described further below, the client computing component 104 may alternatively transmit the associated record identifier in a separate transmission from the resource request.

It will be appreciated by one skilled in the relevant art and others that the client computing component 104 may generate the resource request and associated record identifier itself or receive one or the other or both from another storage or computing device. For example, another computing device, such as processing device 116, may be used to determine whether a test to monitor performance metrics associated with processing a particular resource, such as a Web page, should be conducted. In this example, the processing device 116 may send the test request, which includes a resource identifier corresponding to the desired resource request and a record identifier further associated with the resource identifier, to the client computing device 102.

In one illustrative embodiment, as shown in FIG. 2, the client computing component 104 initiates the content request by transmitting the resource identifier and associated record identifier directly or indirectly to the performance measurement component 106 of the client computing device 102. However, it will be appreciated by one skilled in the relevant art that, in the alternative, the performance measurement component 106 can otherwise intercept the content request initiated by the client computing component 104.

Continuing with the present example and in further reference to FIG. 2, the performance measurement component 106 receives the resource request and forwards the resource request on to the content provider 108 via communication network 114. Thereafter, the performance measurement component 106 continually monitors performance metrics associated with the processing of the requested resource, including any embedded resources. Specifically, in one illustrative embodiment, the performance measurement component 106 monitors network level performance metrics associated with the processing of the requested resource and any embedded resources, such as timing of receipt of the first and last bytes (or packets) of data of each request. The performance measurement component 106 can either obtain such performance metric information directly from the operating system of the client computing device 102 or through the client computing component 104. The performance measurement component 106 associates the monitored performance metrics with the record identifier.

As further illustrated in FIG. 2, the content provider 108 receives the resource request from the client computing device 102 and processes the resource request using content delivery components 110, such as a Web server. The content provider 108 can also use a performance measurement component 112 to monitor performance metrics associated with processing the incoming client request, identifying/obtaining the requested resource, and initiating the transmission of the resource responsive to the client request. As shown in FIG. 2, upon obtaining the requested resource, the content provider 108 initiates transmission of the requested resource to the client computing device 102.

In this illustrative example, the performance measurement component 106 at the client computing device 102 obtains the requested resource, continues monitoring the processing of the requested resource, and forwards the requested resource to the client computing component 104. For example, the performance measurement component 106 may serve as a proxy application for receiving the requested resource or otherwise intercepting the requested resource. The client computing component 104 also tracks performance metrics associated with the processing of the requested resource. Upon receipt of the requested resource, the client computing component 104 begins processing the content for display on a monitor or other display device associated with the client computing device 102. Alternatively, the client computing component 104 can process the content for sending to any other component or external device (e.g., a framebuffer). As will be further described below, the above described functions apply to the processing of the originally requested resource, as well as any embedded resources.

With reference now to FIG. 3, the client computing component 104 and the performance measurement component 106 of the client computing device 102 can each identify performance metric information that the respective components have monitored and/or collected. The performance metric information from the client computing component 104 may include a variety of information, such as process information, memory information, network data, resource data, client computing component information, including page setups, browser rendering information, state variables, and other types of information. In one specific example, the performance metric information may include information regarding a time at which a particular resource was rendered on a Web page, its location on the page, whether the resource was rendered on the device display, and the like. The performance metric information from the performance measurement component 106 of the client computing device 102 can also include a variety of information as similarly set forth generally above. In one specific example, the performance metric data may include network statistics, latencies, bandwidths, and data arrival times, such as the timing of receipt of first and last packets of information for the requested resource and each embedded resource. In another specific example, the performance metric information can include timing information associated with processing executable resources, such as JavaScript, as well as additional information that can be used to indirectly determine processing times associated with the execution of the resource once the executable code has been obtained.

The performance metric information from the client computing component 104 and/or the performance measurement component 106 of the client computing device 102 can also include basic resource information, such as an identification of the resource type, a link to a header associated with the requested resource, a size of the resource, an identification of a domain from which the resource was requested, and the like. Even further, the performance metric information can include underlying computer resource information, such as a resolution of the display of the client computing device 102, a version of the browser application software, an identification of any plugins associated with the browser application software, an identification of any updates to the operating system of the client computing device 102, and the like. Even further, the performance metric information can include information regarding the location of the client device 102 (such as an IP address), servers associated with the content provider 108, and the like.

Still further, the performance metric information can include an identification of limitations and/or restrictions associated with processing resource requests using client computing device hardware and/or software. For example, the performance metric information can include identification of a threshold number (e.g., a minimum, a maximum, a range, and the like) of simultaneous connections to a domain, as well as a total number of simultaneous connections regardless of domain. As another example, the performance metric information can include identification of an order associated with initiating embedded resource requests.

With continued reference to FIG. 3, the client computing component 104 and the performance measurement component 106 of the client computing device 102 provide the identified performance metric information together with the associated record identifier of the requested resource to the metric processing component 118 of the processing device 116 via the communication network 114. The metric processing component 118 then processes the received performance metric information to assess performance related to the processing of the client request for the original resource and any embedded resources. The processed performance metric information can be used to support modifications to the original resource and/or embedded resources to improve performance for subsequent client requests for the original resource. As will be appreciated by one skilled in the art and others, the processing device 116 can store the received and/or processed performance metric information in local data store 120, or any other data store distributed across the network 114. Additionally, as will be further described below in reference to FIGS. 7A-7E, the processing device 116 can cause the display of the processed performance metric information to a user of the system for further assessment.

In one illustrative embodiment, once the client computing component 104 completes processing of the requested resource and any embedded resources, the client computing component 104 identifies performance metric information that the client computing component 104 monitored and/or otherwise collected related to such processing. In this example, the client computing component 104 provides the identified performance metric information with the record identifier associated with the requested resource to the metric processing component 118. Upon receipt of this information, the metric processing component 118 then requests any further performance metric information related to the requested resource and any embedded resources from the performance measurement component 106 of the client computing device 102. In response, the performance measurement component 106 of the client computing device 102 identifies and provides performance metric information with the record identifier associated with the requested resource to the metric processing component 118. The metric processing component 118 can use the record identifier to aggregate the received performance metric information. It will be appreciated by one skilled in the art and others that the identified performance metric information may be transmitted to the metric processing component 118 by a number of alternative methodologies and/or components.

With reference now to FIG. 4, in one illustrative embodiment, the performance measurement component 112 of the content provider 108 can identify performance metric information that it has collected related to the processing of the requested resource and/or any embedded resource. The performance measurement component 112 provides the identified performance metric information to the metric processing component 118 of the processing device 116 via communication network 114. As will be appreciated by one skilled in the art and others, the performance measurement component 112 of the content provider 108 can provide the performance metric information upon request from the processing device 116 or upon completing its processing of the requested resource. As will be described further below, the processing device 116 can then aggregate the performance metric information from all components for displaying, processing, storing, or otherwise assessing performance related to the processing of the requested resource.

In one illustrative embodiment, the metric processing component 118 processes the performance metric information received from some or all network components (e.g., client computing component 104, performance measurement component 106 of the client computing device 102, and/or performance measurement component 112 of the content provider 108, and the like) to assess performance related to the processing of the client request for the original resource and any embedded resources. As previously mentioned, the processed performance metric information can be used to support modifications to the original resource and/or embedded resources to improve performance for subsequent client requests for the original resource. For example, and as will be described further below in reference to FIG. 8, the metric processing component 118 can use the processed performance metric information associated with the original resource and, in this case, two or more embedded resources to dynamically determine an allocation of domains to be associated with the embedded resources to improve performance. As will also be further described below, in making such a determination, the metric processing component 118 can further take into consideration performance metric information collected and associated with subsequent resource requests for the original resource and the corresponding embedded resources using such alternative allocations of domains, as well as domain selection criteria which can be obtained from the original content provider.

Figure 5:
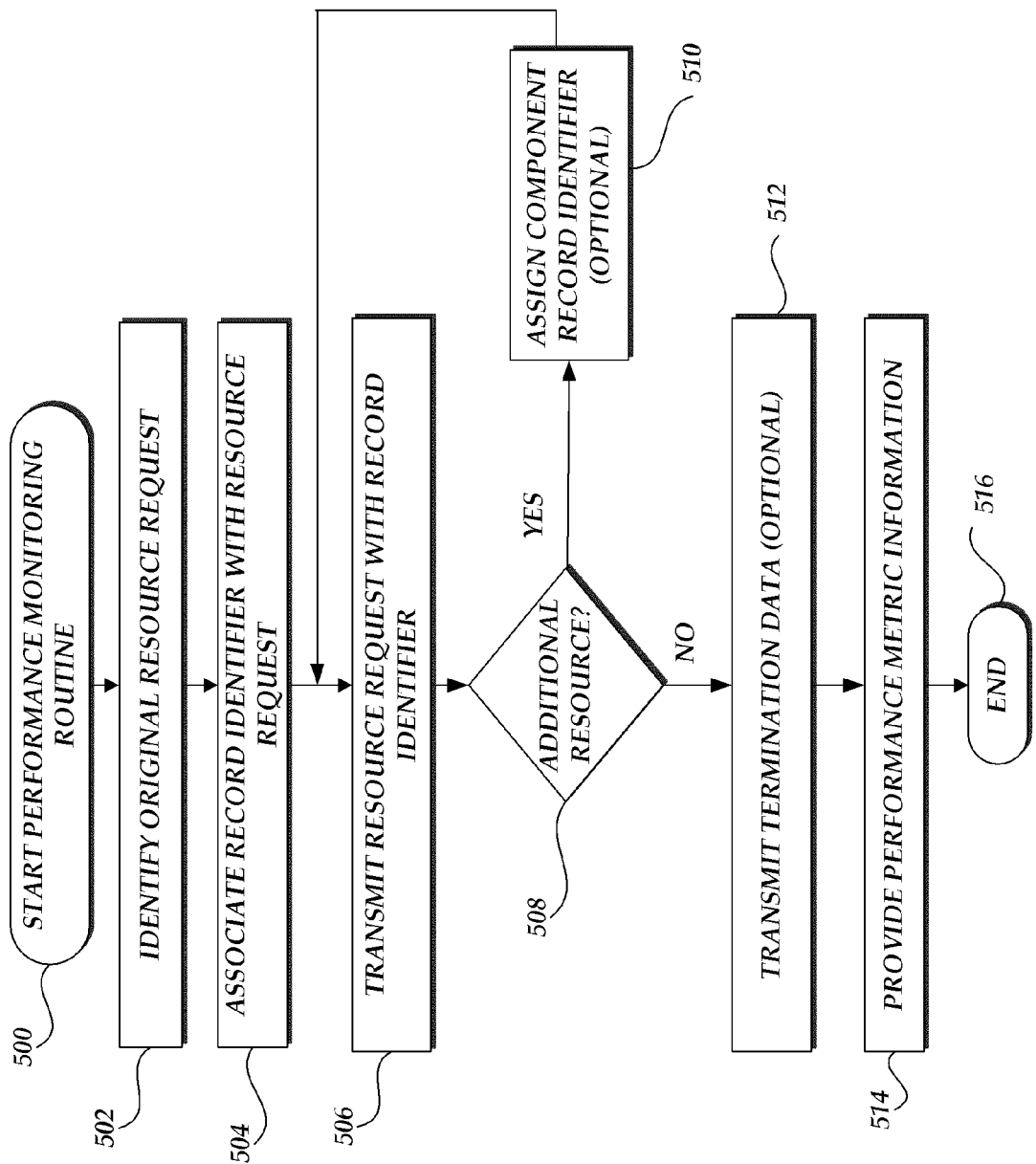
FIG. 5 is a flowchart illustrative of a performance monitoring routine implemented by a client computing device for monitoring the performance associated with resource requests made by the client computing device.

With reference now to FIG. 5, one embodiment of a performance monitoring routine 500 implemented by the client computing component 104 of the client computing device 102 will be described. One skilled in the relevant art will appreciate that actions/steps outlined for routine 500 may be implemented by one or many computing devices/components that are associated with the client computing device 102. Accordingly, routine 500 has been logically associated as being generally performed by the client computing device 102, and thus the following illustrative embodiments should not be construed as limiting.

At block 502, a client computing component 104 identifies an original resource request. As previously mentioned, the client computing component 104 can generate the original resource request or receive the original resource request from another computing device, such as processing device 116. In one example, the original resource request may be for a Web page, such as http://example.com. At block 504, the client computing component 104 associates a record identifier (RID) with the original resource request. The RID may be a unique identifier associated with the original resource request. As will be further described below, the RID can also be associated with any embedded resources included in a response to the original resource request. Even further, although not illustrated, in an alternative embodiment, in the event that the client computing component 104 does not need a RID, the client computing component 104 may not associate a RID with the resource request at shown at block 504.

At block 506, the resource request is transmitted to another entity. In this example, the resource request is transmitted to the performance measurement component 106 of the client computing device 102. As previously mentioned, the performance measurement component 106 can alternatively intercept the transmission request as it is being routed to a content provider 108 for example. In one illustrative embodiment, the resource request may itself contain the RID, such that the resource request and associated RID are transmitted as part of the same transmission. For example, the RID may be included as a portion of the resource URL used to request the resource. Alternatively or additionally, the RID may be transmitted in a second communication, either before or after the transmission including the resource request. For example, a "start new request group" command, including the RID may be issued before or after the initial resource request. In one further alternative embodiment, the client computing component 104 may not include a RID with the issuance of a "start new request group" command, and in this case, the performance measurement component 106 may generate, or otherwise obtain, such a RID upon receipt of the "start new request group" command.

Continuing at block 508, a determination is made at the client computing component 104 regarding whether any additional resources need to be requested to fulfill the original resource request. As appreciated by one skilled in the relevant art, a response to the original resource request may be returned to the client computing component 104 which includes a number of resource URLs corresponding to a number of embedded resources required to fulfill the original resource request. In one embodiment, if such additional resources are identified, processing returns to block 506 where the client computing component 104 transmits one or more requests for the identified embedded resources with the RID associated with the original resource request.

Alternatively or additionally, the client computing component 104 may assign a component record identifier (CRID) to each request for an embedded resource at optional block 510. In this example, when processing returns to block 506, the client computing component 104 may transmit the one or more embedded resource requests with the respectively assigned CRIDs. In an illustrative embodiment, the requests for embedded resources may be transmitted with respective CRIDs alone or together with the RID of the original resource request. As embedded resource requests (or component requests) are fulfilled, the returned content is processed by the client computing component 104. It will be appreciated by those skilled in the art and others that a response to an embedded resource request may include links to further embedded resources. As such, the functionality associated with blocks 506-510 may be repeated as described above until no resource requests are outstanding and no more additional resources need to be requested.

It will be appreciated by one skilled in the relevant art that resource requests are processed by the client computing device 102 in accordance with logic associated with the particular configuration of the browser software application. For example, the browser software application may be limited by a number of resource requests that may be made at one time, an order associated with the type of requests that may by made, an order based on a predetermined location for the requested resources on a display screen, or other limitations provided in the requested base resource.

Once the client computing component 104 determines at block 508 that no additional resources need to be obtained to fulfill the original resource request or any subsequent embedded resource request, processing can continue at optional block 512. At block 512, a termination command, such as "end new request group", may be transmitted to indicate that the request, including requests for all embedded resources, has completed. Such a termination command may provide closure to a "start new request group" command, if one were issued as part of the first iteration of block 506. In this example, the start/termination commands may be received and used by the performance measurement component 106 to determine which requested resources are associated with a particular originally requested resource.

At block 514, once the client computing component 104 has completed processing the requested original resource and any embedded resources, the client computing component 104 provides monitored performance metric information to processing device 116. The client computing component 104 monitors such performance metric information throughout the processing of the original resource request from initiation of the original resource request to final rendering of the requested resource and any embedded resources. The performance metric information can include, for example, timing data associated with the initiation of each request, receipt of a response to each request, and rendering of each requested resource, as well as other information as described herein. The routine 500 ends at block 516.

Figure 6:
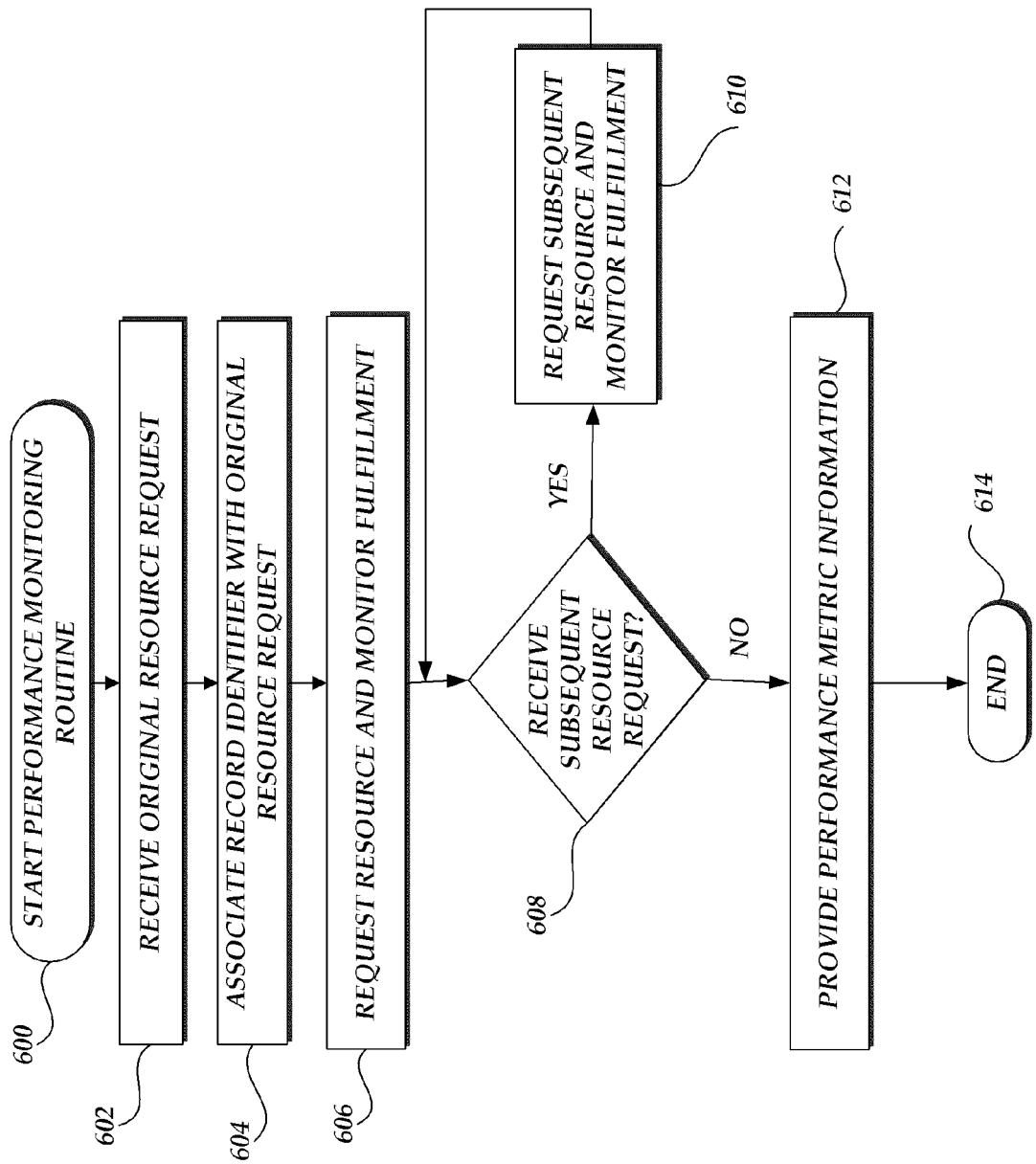
FIG. 6 is a flowchart illustrative of a performance monitoring routine implemented by a performance measurement component for further monitoring client side performance associated with resource requests made by the client computing device.

With reference now to FIG. 6, one embodiment of a performance monitoring routine 600 implemented by the performance measurement component 106 of the client computing device 102 will be described. One skilled in the relevant art will appreciate that actions/steps outlined for routine 600 may be implemented by one or many computing devices/components that are associated with the client computing device 102. Accordingly, routine 600 has been logically associated as being generally performed by the client computing device 102, and thus the following illustrative embodiments should not be construed as limiting.

At block 602, the performance measurement component 106 of the client computing component 100 receives (or intercepts) an original resource request from the client computing component 104. In one illustrative embodiment, the performance measurement component 106 receives the RID with the original resource request. Alternatively, the RID may be provided as a part of a separate transmission, and accordingly, in this case, the performance measurement component 106 receives the RID separately. At block 604, the performance measurement component 106 associates the RID with the original resource request. In accordance with other embodiments discussed above, the original resource request may be preceded or followed by a command or instructions, such as a "start new request group" command. Such commands may be transmitted with or without a RID, as set forth above. If such commands are received at the performance measurement component 106 without a RID, the performance measurement component may generate, or otherwise obtain, a RID to associate the original resource request at block 604.

Continuing at block 606, the original resource may be requested, such as by proxying or forwarding the resource request to the content provider 108 via network 114. The resource request may be modified from its original form before sending, such as by stripping headers including the associated RID. The performance measurement component 106 also monitors the processing, including fulfillment, of the resource request at block 606. For example, the performance measurement component can identify performance metric information related to the initiation of the resource request, the receipt of first and last bytes of data for each requested resource and any embedded resources, the receipt of responsive content, and the like. As will be appreciated by one skilled in the relevant art, once a response to the resource request is received at the performance measurement component 106, the response is returned to the requesting application.

At block 608, a determination is made by the performance measurement component 106 regarding whether a subsequent resource request related to the original resource request has been made by the client computing component 104 and accordingly received (or intercepted) by the performance measurement component. If a subsequent embedded resource request (which may bear the same RID as the original resource request, an appropriate CRID, and/or be within a start/stop command window) is received, processing continues at block 610. At block 610, the performance measurement component 106 requests any embedded resources and monitors the processing of the requested embedded resources as similarly described above in reference to the originally requested resource and block 606. The functionality associated with blocks 608-610 may be repeated as described above until no resource requests are outstanding.

If the performance measurement component 106 determines that no more outstanding resource requests remain at block 608, processing continues at block 612. Specifically, the performance measurement component 106 provides monitored performance metric information to processing device 116. The performance measurement component 106 monitors such performance metric information throughout the processing of the original resource request, from initiation of the original resource request to final rendering of the requested resource and any embedded resources. The performance metric information may include, for example, timing data associated with the initiation of each request, receipt of a response to each request, and receipt of first and last packets of data for each of the original resource request and any embedded resource requests, as well as other additional information as described herein.

In one illustrative embodiment, the performance measurement component 106 can identify performance metric information for providing to the processing device 116 in a variety of ways. For example, in one embodiment, the performance measurement component 106 can store performance measurement information in a log file together with identifiers to associate performance metric information with corresponding resource requests. In this example a set of requested resources may be joined by common RIDs, common CRIDs, associated CRID (e.g., where each component has a distinct CRID, but the distinct CRIDs of a single group have been associated or otherwise linked together, such as by a RID). In another illustrative embodiment, the performance measurement component can retrieve performance metric information from a log file based on timing information associated with a resource request. For example, a set of requested resources may be defined as the resources requested or fulfilled between a start command and an end command, or between an original resource request (inclusive) and a stop command. The routine 600 ends at block 614.

Figure 7A:
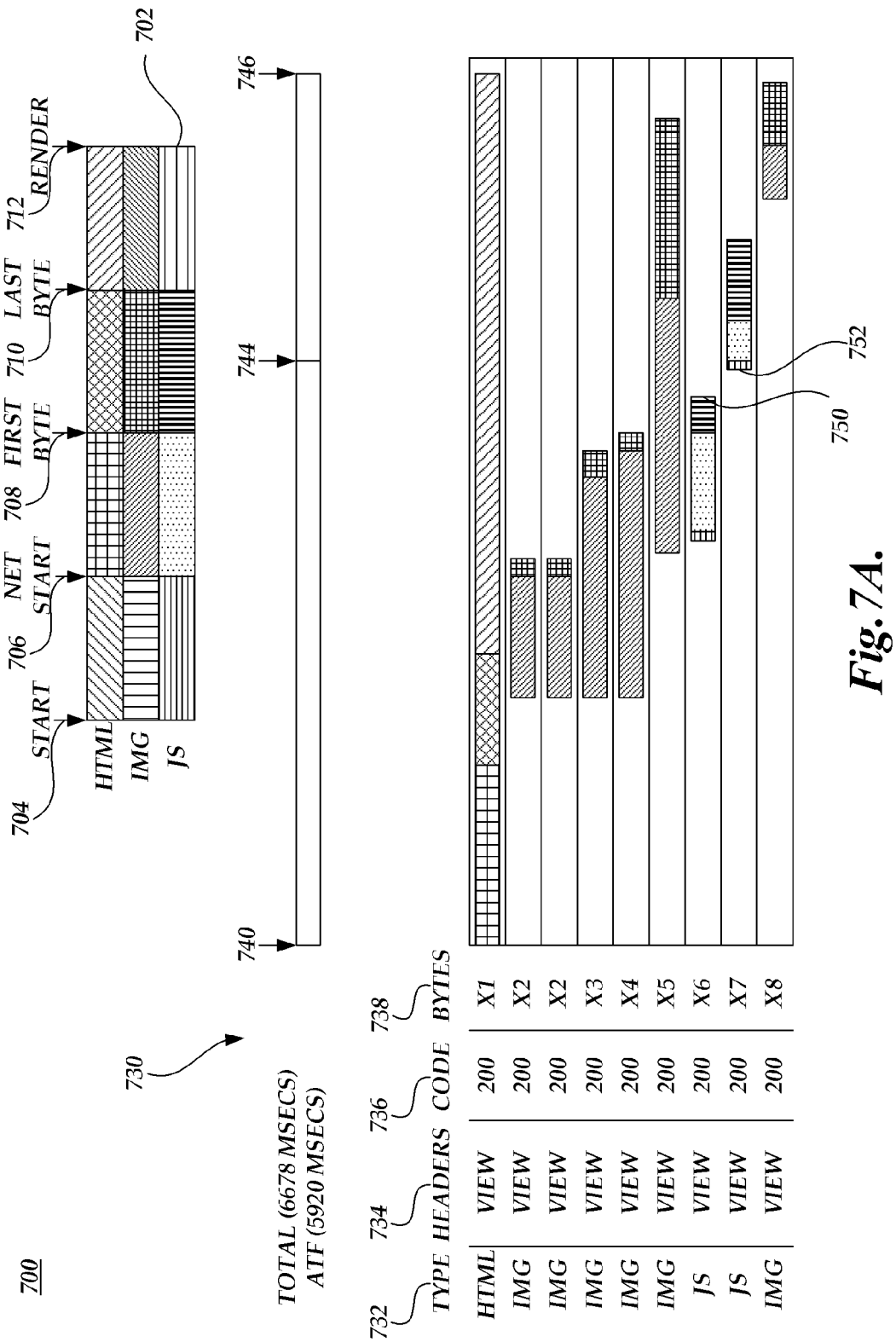
FIGS. 7A-7E are illustrative user interfaces displaying a variety of performance metric information collected by the performance measurement system of FIG. 1.

With reference now to FIG. 7A, an illustrative user interface 700 generated by the processing device 116 for displaying a variety of performance metric information collected, or otherwise identified, by the performance measurement system 100 of FIG. 1 will be described. Generally, the user interface 700 shown in FIG. 7A provides a graphical side-by-side comparison of the performance metric information identified for the originally requested resource and some or all requested embedded resources. The user interface 700 may also be provided over the network 114 for display on other computing devices.

With reference to FIG. 7A, the user interface 700 may be utilized to display a set of time-based events for a set of resources. For example, the user interface 700 may graphically represent an order of time-based events for an originally requested resource and for each subsequent request for embedded resources. More specifically, the user interface 700 includes a legend 702 identifying, for a number of resource types, a graphical indicator corresponding to a number of time-based events 704, 706, 708, 710, and 712 involved in processing a request for the resource. The resource types identified in the legend 702 include HTML resources, image (IMG) resources, and JavaScript (JS) resources. However, it will be appreciated that a number of alternative or additional resource types can be identified. For each resource type, the legend 702 provides a distinct color-coded indicator corresponding to a transition period and/or transition event(s) occurring between each identified event 704, 706, 708, 710, and 712. In one embodiment, the distinct indicators may be visual in nature, such as color-coded, cross-hatched, or the like. In another embodiment, instead of using a distinct indicator for each transition period and/or transition event(s) associated with each resource type as illustrated in FIG. 7A, a distinct indicator may be used simply for each transition period and/or transition event(s) regardless of the resource type.

In an illustrative embodiment, events 704, 706, 708, 710, and 712 correspond to the following time-based events identified by the performance metric information. Event 704 identifies a Start Event representing a time at which the corresponding resource was known to be required by the client computing component 104. Event 706 identifies a NetStart Event representing a time at which the corresponding resource was actually requested by the client computing component 104. The timing of the NetStart Event may not be the same as the Start Event if, for example, the browser software application limits the number of concurrent connections with a particular domain. Event 708 identifies a First Byte Event representing a time at which the first byte (or first packet) of the requested resource is received by the performance measurement component 106 of the client computing device 102. Event 710 identifies a Last Byte Event representing a time at which the last byte (or last packet) of the requested resource is received by the performance measurement component 106 of the client computing device 102. Finally, event 712 identifies a Render Event representing a time at which the client computing component 104 finishes rendering the requested resource.

A second portion 730 of the user interface 700 corresponds to a representation illustrating the occurrence of each of the time-based events 704, 706, 708, 710, and 712 for all or some of the resources requested in resolving the original resource request. In one embodiment, the representation horizontally corresponds to time and vertically corresponds to an ordered listing of the requested resources. In one example, the order can specifically correspond to an order in which the requested resources are initially identified by the client computing component 104. In addition, the second portion 730 of the display includes a variety of additional information adjacent to the time-based event representation for each resource. For example, in a first column 732, a resource type for each resource may be provided, e.g., HTML, image, CSS, JavaScript, and the like. In a second column 734, a link to a header corresponding to each requested resource may be provided. In a third column 736, an HTTP response status code corresponding to each requested resource can be provided. Code 200, for example, is indicative of a standard response for successful HTTP requests. Finally, in a fourth column 738, the size of each resource may be provided.

In another embodiment, yet further additional information may be displayed in the user interface 700. For example, the user interface 700 may display the total processing time, both numerically and graphically, associated with processing the original resource request including any embedded resource requests. In this example, an indicator 740 may illustrate a starting time while an indicator 746 may illustrate an ending time, both associated with the processing of the original resource request as a whole. Additionally, when the original resource request is a request for a Web page, the user interface 700 may illustrate a time, both numerically and graphically, at which all resources have been rendered in a portion of a Web page which is initially visible to a user without scrolling. This portion of the Web page is often referred as an "above the fold," "above the scroll," or "above the crease" portion. An indicator 744 in the user interface 700 of FIG. 7A illustrates an "above the fold" (ATF) event.

The foregoing performance metric information provided in the user interface 700 may be identified and/or collected by a combination of the client computing component 104 and/or the performance measurement component 106 of the client computing device 102. However, it will be appreciated by those skilled in the art and others that additional performance metric information can be displayed. Such additionally displayed performance metric information can be obtained by the client computing device 102, by the performance measurement component 112 of the content provider 108, or based on further processing of any of the identified and/or collected performance metric information. It will yet further be appreciated by one skilled in the relevant art that each resource and/or each type of resource may be associated with all or only a portion of the above-described events and/or performance metric information. In addition, other events and/or indicators associated with the other events may be used and illustrated in the user interface 700.

In one specific example, an executable resource, such as a JavaScript resource, is not rendered and, accordingly, neither a Render Event 712 nor an associated indicator illustrating the transition between a Last Byte Event 710 and a Render Event 712 will be illustrated in the user interface 700 for that executable resource. However, the processing device 116 can indirectly determine and display a processing time associated with execution of the code once the code itself is obtained (i.e., receipt of the last byte of the code which corresponds to the Last Byte Event 710). Such processing time is inferred in the user interface 700 of FIG. 7A by illustration of a gap formed between the receipt of the last byte of code associated with a first JavaScript resource at 750 and the start event associated with a subsequently requested JavaScript resource at 752. Alternatively, an additional event and/or associated indicator could be used to specifically identify the processing time associated with execution of the code.

By providing and displaying the foregoing performance metric information as set forth above, a user of the processing device 116 can readily evaluate the performance associated with processing the originally requested resource, including any embedded resources. In particular, the user interface 700 can help a user identify any problems associated with the processing of the originally requested resource, as well as determine one or more solutions to the identified problem. Solutions for improving performance may include, for example, making changes to the content itself, to the organization of content within the originally requested resource, to the client computing component, and the like.

Additionally, the user interface 700 can be used to illustrate a recommendation associated with the processed and displayed performance metric information. For example, and as will be described further below, the processing device 116 may dynamically identify one or more sets of domains to be utilized in conjunction with processing a subsequent request corresponding to the original base resource and two or more embedded resources and initiate testing of the subsequent request. As similarly set forth above with respect to the original base resource request, the user interface 700 can be used to display performance metric information associated with the processing of each of these subsequent requests. In addition, the user interface 700 can be used to display a recommendation identifying a particular allocation of domains which, for example, has been tested and demonstrated improved performance associated with processing the requested resources.

Figure 7B:
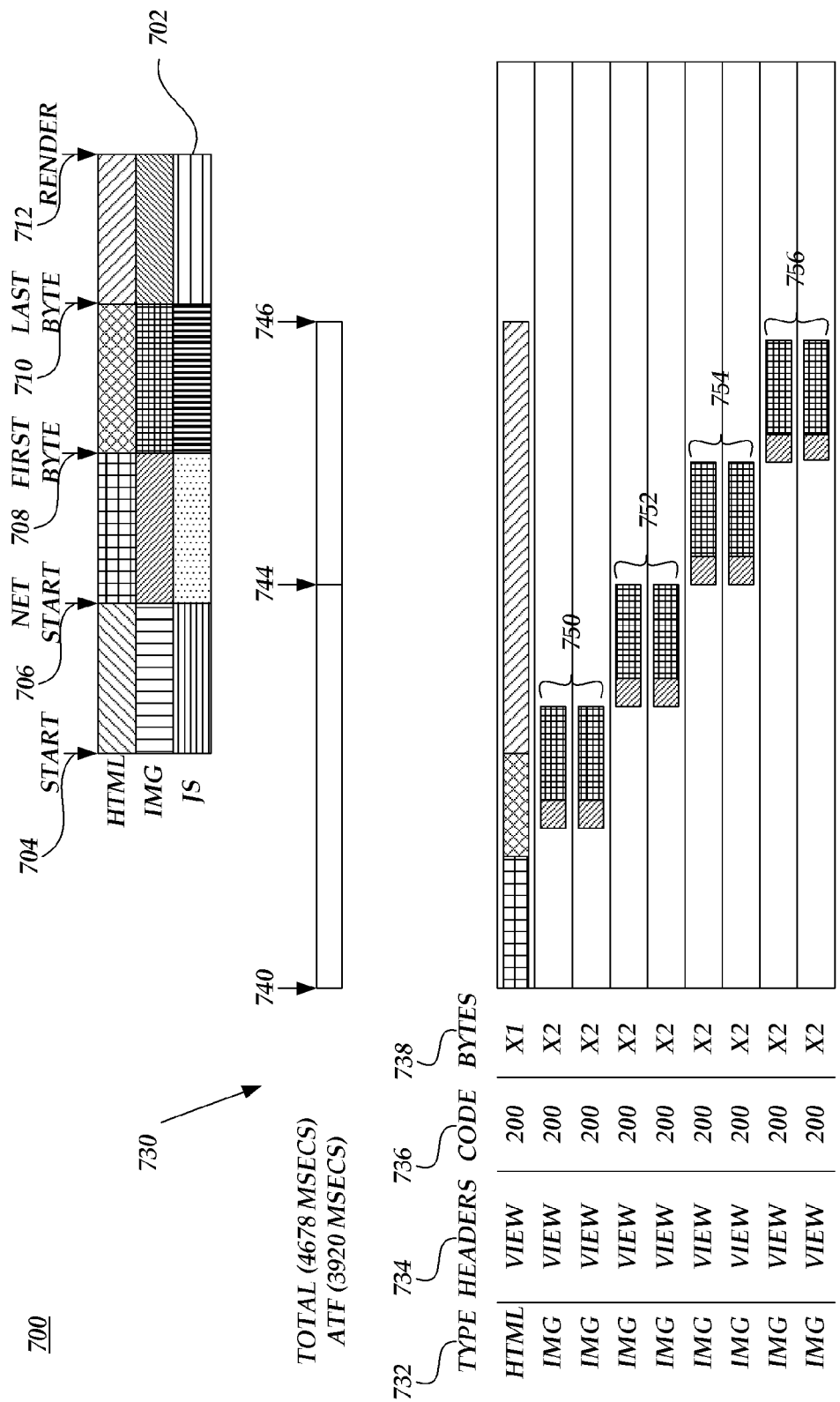

FIG. 7B illustrates the performance associated with processing a request for an original resource and two or more embedded resources where the embedded resources are requested by a client computing device 102 from the same domain (e.g., a domain associated with the domain name example.com). In particular, FIG. 7B illustrates that the last byte of data for the first two embedded image resources 750 is returned to the client computing device 102 before the next two embedded image resources 752 are requested by the client computing device 102, and so on for each of the last four depicted image resources 754 and 756. Based on such performance data, the processing device 116 may determine that one or more limitations are operating to restrict network traffic to and/or from the client computing device. These limitations may, for example, include browser-imposed limits associated with a threshold number of simultaneous connections to a given domain name, as well as a total number of simultaneous connections regardless of domain. In particular, in reference to the illustrative embodiment corresponding to FIG. 7B, these limitations may include browser-imposed limits of requesting and receiving no more than two resources from a particular domain at any given time and no more than eight resources in total (regardless of domain) at any given time. This determination can be inferred from performance data identifying the timing of an initial request for the resource and a return of the last byte of information associated with the requested resource. The timing information may be considered alone or together with an identification of the domain from which each resource is requested. Moreover, in one embodiment, the user interface 700 depicted in FIG. 7B may also include an identification of the domain (e.g., the domain name) from which each of the resources is requested. In another embodiment, instead of inferring the above-identified limitation from the timing information, the performance data received by the processing device 116 may explicitly include an identification of such limitations associated with the client computing device 102 (e.g., a threshold number of simultaneous connections to a domain, as well as a total number of simultaneous connections regardless of domain).

Figure 7C:
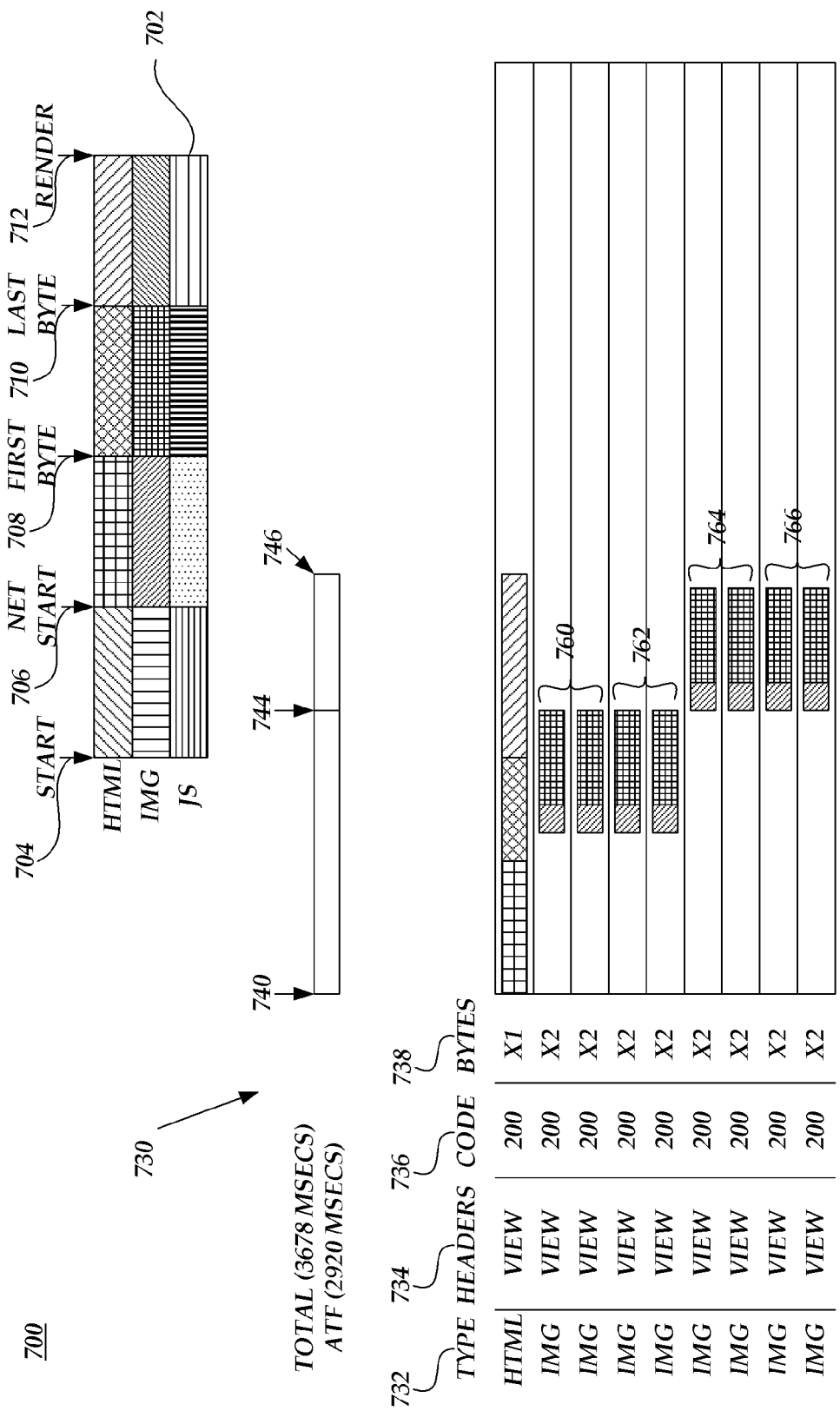

FIG. 7C illustrates the performance associated with processing a subsequent request for the original resource and the two or more embedded resources originally requested in reference to FIG. 7B. In this example, instead of requesting the embedded resources from a single domain, the embedded resources are requested from one of two domains. Accordingly, for example, the first two embedded image resources 760 are requested from a first domain, e.g., associated with the domain name example.com, while the next two embedded image resources 762 are requested from a second domain, e.g., associated with the domain name example1.com. In this example, and as shown in FIG. 7C, since the client computing device 102 can maintain two simultaneous connections per domain, these first four embedded image resources 760 and 762 can be requested and received simultaneously. Once the embedded resources 760 associated with the first domain have been received, the next two embedded image resource requests associated with the first domain may be made, which in this example correspond to image resource pair 764, as also illustrated in FIG. 7C. Similarly, once the embedded resources 762 associated with the second domain have been received, the next two embedded image resource requests associated with the second domain may be made, which in this example correspond to image resource pair 766, as also further illustrated in FIG. 7C. Accordingly, in this example, while the total number of simultaneous connections regardless of domain is limited to eight, all of these simultaneous connections are not utilized given the particular allocation of domains associated with the embedded resources and the limitation of two simultaneous connections to any given domain.

As illustrated by a comparison of the processed performance information depicted in FIGS. 7B and 7C, the use of the allocation of domains providing for use of two domains from which embedded resources can be requested improved performance associated with processing a request for the original resource and the embedded resources in this instance. This result is demonstrated by the overall reduced processing time associated therewith. In one embodiment, the user interfaces illustrated in FIGS. 7B and 7C can be provided to the content provider along with a specific recommendation, for example, to consider using the allocation of domains associated with FIG. 7C in order to improve performance.

In another embodiment, in accordance with the examples illustrated in reference to FIGS. 7B and 7C, a further subsequent resource request corresponding to a different allocation of domains may be tested in order to fully utilize the total number of eight simultaneous connections regardless of domain. In this case, each of the pairs of embedded resources 760, 762, 764, and 766 are each requested from a different domain, e.g., example1.com, example2.com, example3.com, and example4.com respectively.

It will be appreciated by one skilled in the relevant art and others that a number of factors may affect performance associated with processing a resource request and, accordingly, increasing a number of domains from which embedded resources are requested may not always improve performance. Factors that can be considered in determining whether an allocation of domains associated with two or more embedded resources will improve performance include, for example, a number of embedded resources corresponding to the original resource request, a size associated with each of the embedded resources, a total or effective bandwidth over which the request is made and resource is returned, a threshold number of simultaneous connections to a domain, a total number of simultaneous connections regardless of domain, an order of requesting the embedded resources, and the like. In addition, network architecture and topology generally may affect performance and may therefore be considered in determining whether an allocation of domains will improve performance. For example, network congestion on one or more nodes of the network between a given client and server may act to limit the effective bandwidth between the client and server to an amount less than the bandwidth available to either the client or the server, and accordingly interject network and/or server latencies into the processing of a resource request. Even further, various cost metrics may also be taken into consideration, such as costs associated with registering and maintaining multiple domains.

With respect to these and other factors, it may be possible to associate the factor's influence on performance to predict the expected result that the combination of that factor will have with respect to changing the number of domains used. However, it may not always be possible to predict the influence the combination of factors will have with respect to changing the number of domains used. Because such factors may influence the overall processing performance associated with a request for an original resource and corresponding embedded resources, the determination of an allocation of domains that achieves the best or desired level of performance for a particular resource request will be analyzed by a review of the performance information resulting from the associated test cases. Accordingly, in one embodiment, the determination of an allocation of domains associated with a resource request may be a function of the overall performance information, which may inherently be a function of a combination of the above factors, for example.

Figure 7D:
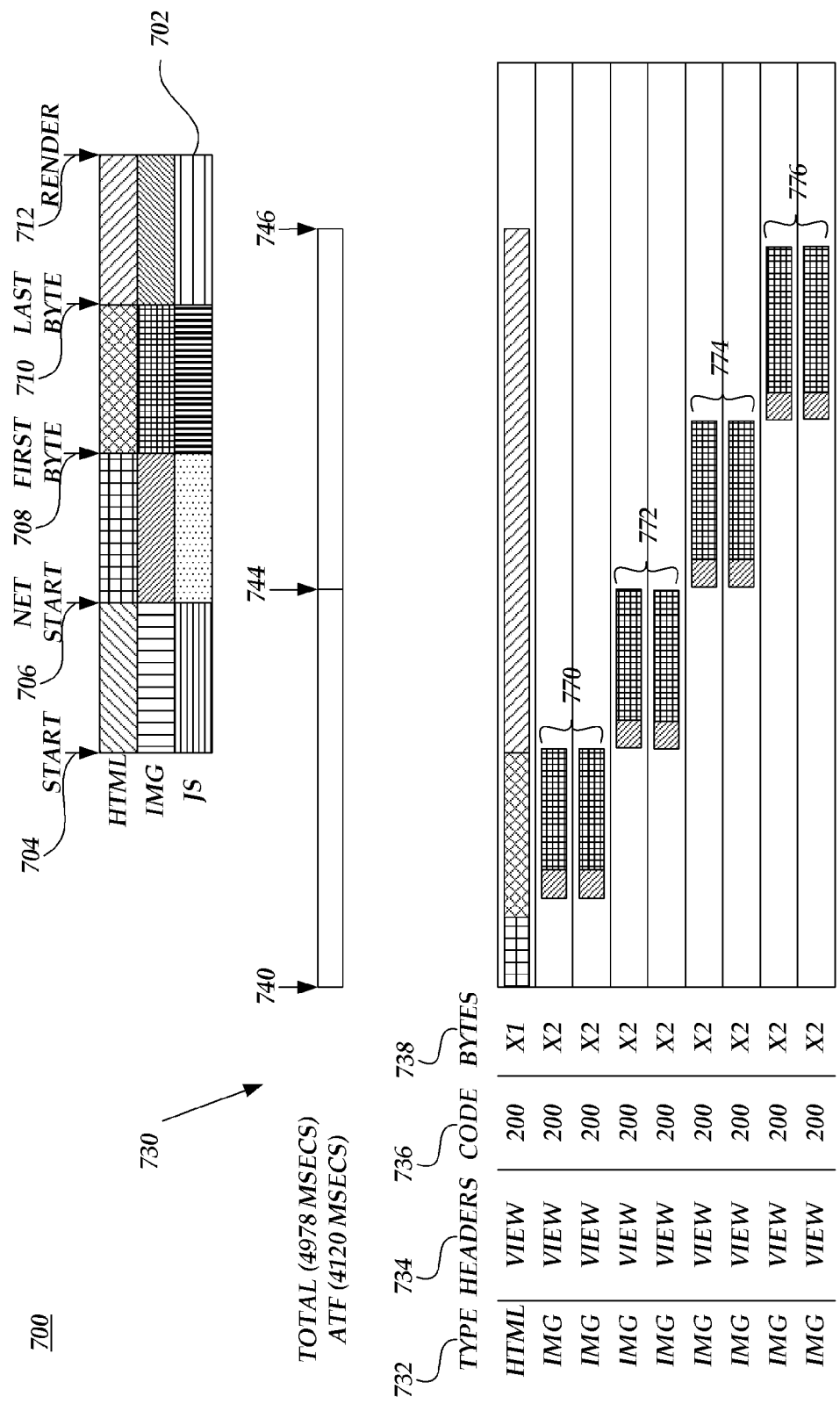
Figure 7E:
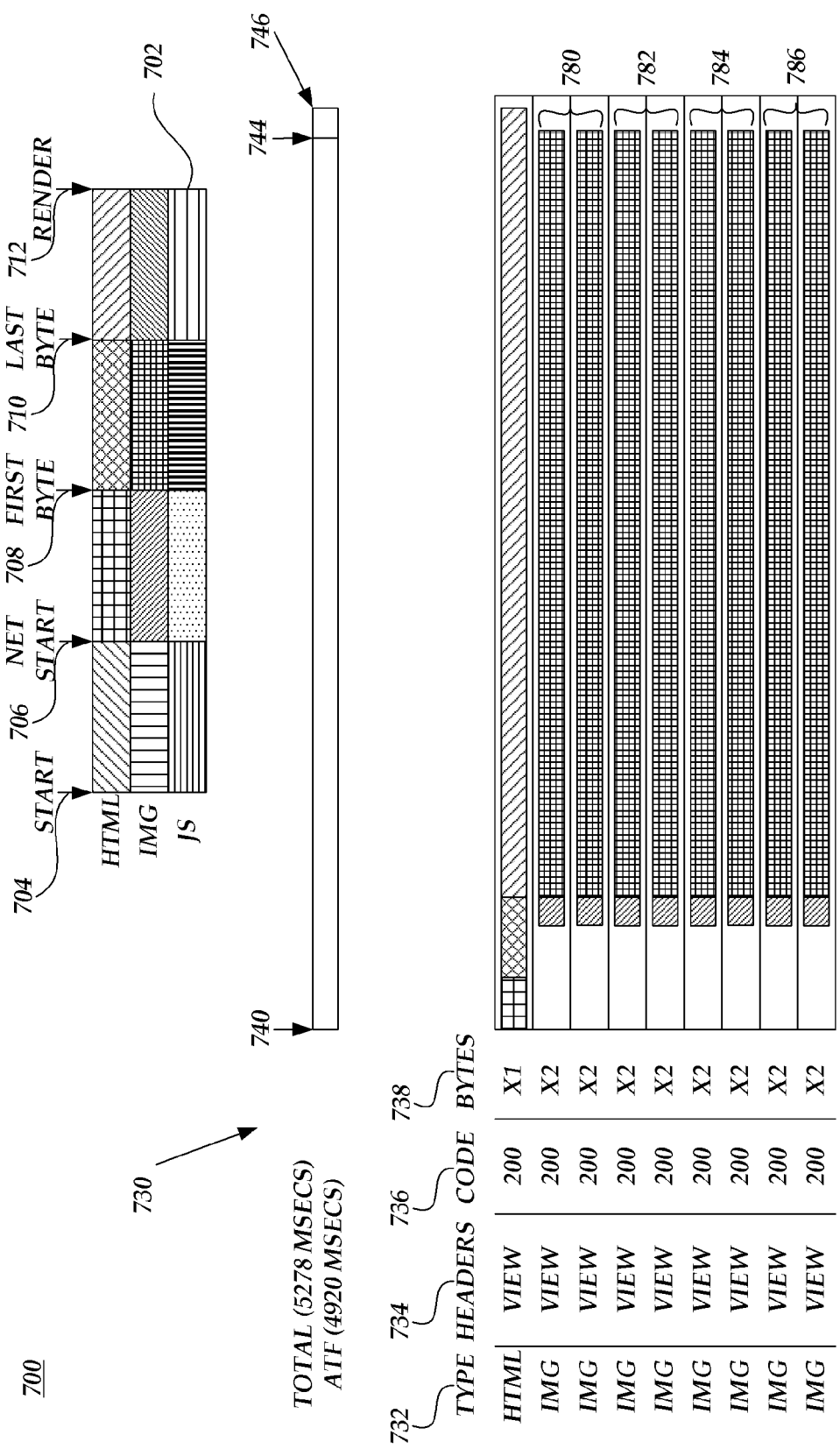

As a simplified example of the effect of one of the foregoing identified factors on processing performance, FIG. 7D illustrates the processing of a request for an original resource and two or more embedded resources identical to those processed and illustrated in reference to FIG. 7B with the exception that the embedded resource requests are made over connections associated with a relatively lower bandwidth, which may be more susceptible to saturation as will be further illustrated in reference to FIG. 7E. In this instance, in reference to FIG. 7D, the resulting processed performance information illustrates that only two embedded resources are requested and received at any given time from a single domain (as illustrated by embedded resource pairs 770, 772, 774 and 776 which are all associated with the same domain) and that the overall processing time for the embedded resources is longer in FIG. 7D than the same in FIG. 7B.

Alternatively, FIG. 7E illustrates the performance associated with processing a subsequent request for the original resource and the two or more embedded resources originally requested in reference to FIG. 7D via connections associated with the same relatively slower bandwidth. However, in the example provided in reference to FIG. 7E, instead of requesting the embedded resources from a single domain, each pair of embedded resources 780, 782, 784, and 786 are requested from a different domain. Accordingly, the eight embedded image resources illustrated in FIG. 7E can all be requested and received simultaneously. However, as illustrated by a comparison of the performance information illustrated in FIGS. 7D and 7E, the use of the allocation of domains providing for use of four domains from which eight embedded images resources can be requested did not improve performance associated with processing a request for the original resource and the embedded resources in this instance. This result is demonstrated by the overall increased processing time associated therewith, and in this simplified example, may be attributable to increased latency associated with saturating the available bandwidth. Specifically, by increasing the number of requests being simultaneously initiated (via use of multiple domains in accordance with the foregoing example) and thus also increasing the total number of bytes of data being sent over those connections (until a maximum number of connections is reached), the available bandwidth can become saturated resulting in latencies in processing the requests. Therefore, the system 100 would not necessarily recommend to increase the number of domains in some scenarios.

In addition to measuring the performance impact attributable to use of a particular number of domains and simultaneous connections, the effect of the particular mapping between domains and embedded resources can also be analyzed and varied. For example, a particular domain may be associated with a relatively slow (or fast) connection or server. Performance may be impacted, for example, by the number of resources mapped to the "slow" domain. As such, the system 100 may recommend to decrease the number of resources mapped, such as by remapping them to a faster domain. As another example, particular resources may be considered high priority based on factors such as their identity, size, layout location, processing priority, and the like. The system 100 may recommend a mapping of domains to resources such that high-priority resources are accorded earlier download priority. This can be accomplished, for example, by mapping low-priority resources to a first domain (or set of domains) while mapping high-priority resources to a second domain (or set of domains). In such a case, the low-priority resources may form one queue for network and/or server access while high-priority resources form a separate queue.

Figure 8:
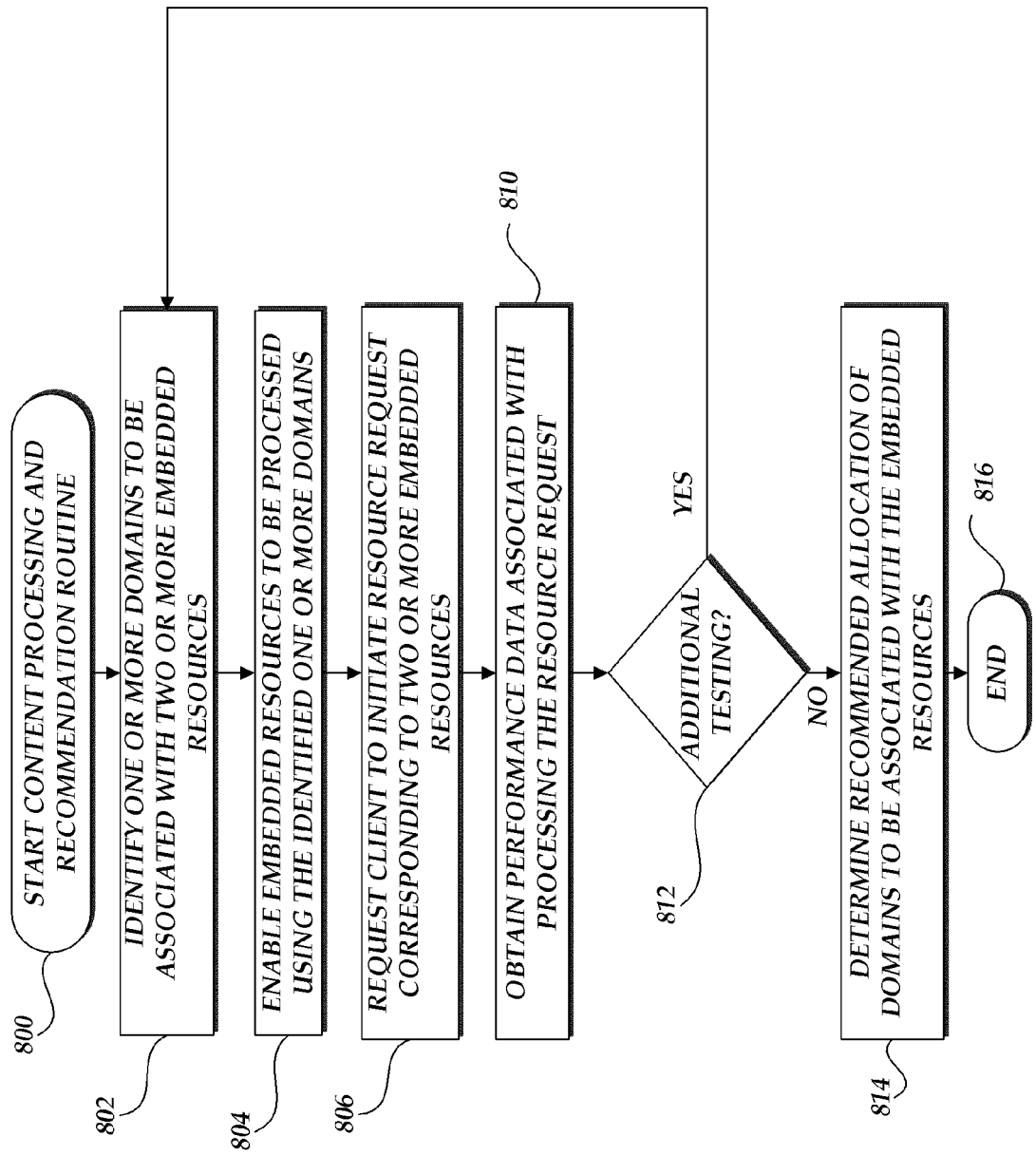
FIG. 8 is a flowchart illustrative of a content processing and recommendation routine implemented by the processing device of the performance measurement system of FIG. 1 for processing a resource request corresponding to two or more embedded resources and determining an allocation of domains to be associated with the embedded resources.

With reference now to FIG. 8, one embodiment of a content processing and recommendation routine 800 implemented by the processing device 116 of the performance measurement system 100 will be described. One skilled in the relevant art will appreciate that actions/steps outlined for routine 800 may be implemented by one or many computing devices/components that are associated with the processing device 116. Accordingly, routine 800 has been logically associated as being generally performed by the processing device 116, and thus the following illustrative embodiments should not be construed as limiting.

At block 802, the processing device 116 identifies a set of one or more domains to be associated with two or more embedded resources and to thereafter be utilized to process a resource request for an original resource and the two or more corresponding embedded resources. The processing device 116 can take into consideration a variety of information for identifying a set of domains. For example, in one embodiment, the processing device 116 can receive a request from a content provider to test a specifically identified set of domains or a specific allocation of domains in order to assess performance associated with processing the resource request using the identified set or allocation of domains. An allocation of domains identifies not only a specific set of domains to be used to process the resource request, but also the association of each of the domains to each of the embedded resources corresponding to the resource request. An allocation of domains may also specify an order associated with requesting each of the embedded resources from a corresponding domain.

In another embodiment, the processing device 116 can dynamically identify, based on previously processed performance metric information associated with a first request for an original resource and two or more embedded resources, a set or allocation of domains that could be used to process a subsequent request for the two or more embedded resources and to possibly offer improved performance. Alternatively, in yet another embodiment, the processing device 116 may automatically decide to test, and hence identify, a set or allocation of domains regardless of the assessed performance associated with processing the first resource request for the original resource and two or more corresponding embedded resources.

The processing device 116 can take into consideration a number of factors in identifying, for testing purposes, a set and/or allocation of domains to be associated with two or more embedded resources. As similarly set forth above, such factors include, for example, a number of embedded resources corresponding to the original resource request, a size associated with each of the embedded resources, a total or effective bandwidth over which the request is made and resource is returned, a threshold number of simultaneous connections to a domain, a total number of simultaneous connections regardless of domain, an order of requesting the embedded resources, and the like.

In addition or alternatively, the processing device 116 can take into consideration a variety of other domain selection criteria. The service provider selection criteria can include, for example, domain quality of service information, cost information associated with processing a resource request using a particular domain, and the like. The quality of service information can include information regarding reliability, service level quality, transmission errors, and the like. Specifically, in one embodiment, the processing device 116 can obtain domain selection criteria from the content provider 108. The content provider 108 may want the processing device 116 to only test domains which meet a minimum quality of service level or which would only cost a specified amount to implement.

At block 804, once the processing device 116 identifies an allocation of domains to use in processing a resource request, the processing device 116 enables the two or more embedded resources corresponding to the resource request to be processed and/or transmitted by each identified and associated domain. Specifically, in one embodiment, the processing device 116 associates, for each embedded resource of the two or more embedded resources, a domain from the set of domains from which the associated embedded resource will be requested. In another embodiment, the processing device 116 also determines configuration information for enabling the use of the set of domains to process and/or transmit the two or more associated embedded resources. The processing device 116 uses the configuration information to prepare the domain for processing and/or transmitting content as necessary.

In one illustrative embodiment, where the resource request corresponds to a request for a Web page, the processing device 116 can continue to use the original resource identifier for the original resource request. In this embodiment, the content provider 108 continues to maintain and provide the HTML code that is responsive to the original resource request. However, in one example, an identified domain can be prepared to provide various resources embedded in the HTML code returned by the content provider 108. Accordingly, the processing device 116 can modify at least a portion of the HTML code with translated embedded resource requests. Specifically, the two or more embedded resource identifiers can be modified such that they are now directed to a particular associated domain from the identified set of domains.

In another embodiment, the processing device 116 can store the HTML code of the Web page to be tested on a local server. In this case, the processing device 116 modifies the original resource identifier to query the processing device 116 (or associated Web server) for the requested resources. For example, the processing device 116 can modify the original resource identifier as http://www.processingdevice.com/contentprovider.com/path/resource.xxx. In this embodiment, the processing device 116 would provide the modified HTML that would include translated embedded resource identifiers.

Returning to FIG. 8, at block 806, the processing device 116 then initiates the resource request associated with content to be processed and/or transmitted by the set of domains by requesting that the client computing device 102 initiate the query. As similarly described above, the client computing device 102 monitors and collects performance data associated with the processing of the resource request and provides the performance data to the processing device 116. Accordingly, at block 810, the processing device 116 obtains and processes the performance data from the client computing device 102. The obtained performance data is associated with the processing of the resource request using the set of domains to provide the two or more associated embedded resources corresponding to the resource request.

Next, at block 812, a determination is made whether any additional sets of domains should be used to process the two or more embedded resources corresponding to the resource request and, accordingly, be tested to determine how the use of the additional sets of domains may affect the performance associated with processing such a request. If an additional set of domains is to be identified, then processing returns to block 802 and the foregoing process in reference to blocks 802-812 is repeated as described above. If no additional set of domains is identified, processing continues at block 814.

At block 814, the processing device 116 dynamically determines an allocation of domains to be associated with the two or more embedded resources based on the obtained and processed performance data. Additionally or alternatively, the processing device 116 can take into consideration a number of factors in determining a recommended allocation of domains to be associated with the embedded resources. Again, as similarly set forth above, such factors include, for example, a number of embedded resources corresponding to the original resource request, a size associated with each of the embedded resources, a total or effective bandwidth over which the request is made and resource is returned, a threshold number of simultaneous connections to a domain, a total number of simultaneous connections regardless of domain, an order of requesting the embedded resources, and the like.

Even further, the processing device may, additionally or alternatively, take into consideration domain selection criteria in the determination of a recommended allocation of domains. As also similarly mentioned above, the domain selection criteria can be obtained from a content provider 108 and can include quality of service information, cost information, and the like. As also set forth above, the quality of service information can include information regarding reliability, service level quality, transmission errors, and the like. In one example, the processing device 116 can determine that an allocation of domains corresponding to the best performance data is the determined allocation of domains. Alternatively, a content provider 108 may not want to implement the best performing allocation of domains for processing and/or transmitting the two or more embedded resources in an associated Web page, but rather wants to take into consideration cost. Accordingly, in that case, the processing device 116 may select the allocation of domains associated with the best performing allocation of domains within a particular cost range.

In addition to determining the allocation of domains to be associated with the embedded resources, the processing device 116 can also generate a recommendation identifying the determined allocation of domains or provide an evaluation of all of the tested allocations of domains together with a recommendation of the determined allocation of domains. Such recommendations and/or evaluations can then be provided to the content provider 108. The processing device 116 can also generate and provide modified HTML code with translated embedded resources to the content provider 108 for utilizing the determined allocation of domains. The routine ends at block 816.

It will be appreciated by those skilled in the art and others that while processing, monitoring, and other functions have been described herein as being performed at various components of the client computing device 102 and/or the processing device 116, these functions can be distributed across one or more computing devices. In addition, the performance metric information monitored at the client computing device 102 can be maintained globally by the client computing device 102 and shared with all or some subset of the components of the client computing device 102.

It will further be appreciated by those skilled in the art and others that all of the functions described in this disclosure may be embodied in software executed by one or more processors of the disclosed components. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for monitoring performance associated with processing a resource request, the system comprising:
    a client computing component associated with a client computing device, wherein the client computing component is operable to determine a first set of performance data associated with processing a resource request, wherein the resource request corresponds to two or more embedded resources;
    a performance measurement component associated with the client computing device, wherein the performance measurement component is operable to determine a second set of performance data associated with processing the resource request; and
    a processing component operable to:
        obtain, from the client computing component, the first set of performance data associated with processing the resource request;
        obtain, from the performance measurement component, the second set of performance data associated with processing the resource request;
        identify one or more sets of domains to be utilized in conjunction with a subsequent resource request as a function of both bandwidth and a threshold number of simultaneous connections for initiating requests to a single domain, wherein the subsequent resource request corresponds to the two or more embedded resources;
        for each set of domains in the one or more sets of domains:
            associate, for each embedded resource of the two or more embedded resources, a domain from the set of domains from which the associated embedded resource will be requested;
            cause an initiation of the subsequent resource request associated with the set of domains; and
            obtain, from the client computing component and the performance measurement component performance data related to processing of the subsequent resource request using the set of domains; and
        dynamically determine a recommended allocation of domains to be associated with the two or more embedded resources based on the first and second sets of performance data and the performance data related to processing the subsequent resource request using each of the one or more sets of domains.

2. The system as recited in claim 1, wherein the processing component is further operable to generate code for the two or more embedded resources to be processed using the determined allocation of domains.

3. The system as recited in claim 1, wherein dynamically determining a recommended allocation of domains, by the processing component, is a function of bandwidth.

4. The system as recited in claim 1, wherein dynamically determining a recommended allocation of domains, by the processing component, is a function of a threshold number of simultaneous connections to a single domain by the client computing component.

5. The system as recited in claim 1, wherein dynamically determining a recommended allocation of domains, by the processing component, is based on domain selection criteria.

6. The system as recited in claim 5, wherein the domain selection criteria includes quality of service information.

7. The system as recited in claim 5, wherein the domain selection criteria includes cost information associated with processing the subsequent resource request.

8. The system as recited in claim 1, wherein the processing component is further operable to obtain domain selection criteria from the content provider.

9. A method comprising:
    under control of one or more configured computer systems,
        identifying one or more sets of domains to be utilized in conjunction with processing a request corresponding to two or more embedded resources;
        for each set of domains in the one or more sets of domains:
            associating, for each embedded resource of the two or more embedded resources, a domain from the set of domains from which the associated embedded resource will be requested;
            causing an initiation of a request corresponding to the two or more embedded resources, wherein the request is associated with the set of domains; and
            obtaining performance data related to processing of the request using the set of domains; and
        dynamically determining a recommended allocation of domains to be associated with the two or more embedded resources based on the performance data.

10. The method as recited in claim 9, wherein obtaining performance data related to processing of the request using each of the one or more sets of domains comprises:
    obtaining, from a client computing component, performance data associated with a record identifier, wherein the performance data is associated with processing the request;
    obtaining, from a performance measurement component, performance data associated with a record identifier, wherein the performance data is associated with processing the request and includes timing information as to the receipt of the first and last bytes of data for each embedded resource associated with the request; and associating the performance data from the client computing component and the performance measurement component using the record identifier.

11. The method as recited in claim 9 further comprising generating a recommendation to use the determined allocation of domains to process a subsequent request corresponding to the two or more embedded resources.

12. The method as recited in claim 9 further comprising generating code for the two or more embedded resources to be processed using the determined allocation of domains.

13. The method as recited in claim 9, wherein identifying one or more sets of domains is a function of bandwidth.

14. The method as recited in claim 9, wherein identifying one or more sets of domains is a function of a threshold number of simultaneous connections to a single domain.

15. The method as recited in claim 9, wherein identifying one or more sets of domains is a function of two or more of the group comprising: a number of embedded resources corresponding to the request, a size associated with each of the embedded resources corresponding to the request, a bandwidth, a threshold number of simultaneous connections for initiating requests to a single domain, a total number of simultaneous connections regardless of domain, and an order of requesting the two or more embedded resources.

16. The method as recited in claim 9, wherein dynamically determining a recommended allocation of domains is a function of bandwidth.

17. The method as recited in claim 9, wherein dynamically determining a recommended allocation of domains is a function of a threshold number of simultaneous connections to a single domain.

18. The method as recited in claim 9, wherein dynamically determining a recommended allocation of domains is a function of an order of requesting the two or more embedded resources.

19. The method as recited in claim 9, wherein dynamically determining a recommended allocation of domains is a function of two or more of the group comprising: a number of embedded resources corresponding to the request, a size associated with each of the embedded resources corresponding to the request, a bandwidth, a threshold number of simultaneous connections for initiating requests to a single domain, a total number of simultaneous connections regardless of domain, and an order of requesting the two or more embedded resources.

20. The method as recited in claim 9, wherein dynamically determining a recommended allocation of domains is further based on domain selection criteria.

21. The method as recited in claim 20, wherein the domain selection criteria includes quality of service information.

22. The method as recited in claim 20, wherein the domain selection criteria includes cost information associated with processing the request.

23. The method as recited in claim 9 further comprising obtaining, from a content provider, domain selection criteria.

24. The method as recited in claim 23, wherein dynamically determining a set of domains is further based on the domain selection criteria provided by the content provider.

25. A method comprising:
under control of one or more configured computer systems,
obtaining, from a client computing device, performance data associated with processing a first resource request, wherein the first resource request corresponds to two or more embedded resources;
dynamically identifying one or more sets of domains to be utilized in conjunction with processing a subsequent request corresponding to the two or more embedded resources, wherein the one or more sets of domains to be utilized in conjunction with processing the subsequent request are different from one or more sets of domains utilized in conjunction with processing the first resource request;
for each set of domains in the one or more sets of domains, causing an initiation of the subsequent request corresponding to the two or more embedded resources, wherein the subsequent request is associated with the set of domains; and
dynamically determining a recommended allocation of domains to be associated with the two or more embedded resources based on the performance data associated with processing the subsequent request using each of the identified one or more sets of domains.

26. The method as recited in claim 25, wherein obtaining performance data associated with processing the requested resource comprises:
obtaining, from a client computing component, performance data associated with a record identifier, wherein the performance data is associated with processing the resource request;
obtaining, from a performance measurement component, performance data associated with a record identifier, wherein the performance data is associated with processing the resource request and includes timing information as to the receipt of the first and last bytes of data for each embedded resource associated with the request; and
associating the performance data from the client computing component and the performance measurement component using the record identifier.

27. The method as recited in claim 25, wherein dynamically identifying one or more sets of domains to be utilized in conjunction with the subsequent request is based on the obtained performance data.

28. The method as recited in claim 25, wherein dynamically identifying one or more sets of domains to be utilized in conjunction with the subsequent request comprises processing the obtained performance data and dynamically identifying one or more sets of domains to be utilized in conjunction with the subsequent request if the processed performance data fails to meet a predetermined level of performance.

29. The method as recited in claim 25, wherein dynamically identifying one or more sets of domains is a function of bandwidth.

30. The method as recited in claim 25, wherein dynamically identifying one or more sets of domains is a function of a threshold number of simultaneous connections to a single domain.

31. The method as recited in claim 25, wherein dynamically identifying one or more sets of domains is a function of two or more of the group comprising: a number of embedded resources corresponding to the request, a size associated with each of the embedded resources corresponding to the request, a bandwidth, a threshold number of simultaneous connections to a single domain, a total number of simultaneous connections regardless of domain, and an order of requesting the two or more embedded resources.

32. The method as recited in claim 25, wherein dynamically identifying one or more sets of domains to be utilized in conjunction with the subsequent request is based on domain selection criteria.

33. The method as recited in claim 32, wherein the domain selection criteria includes quality of service information.

34. The method as recited in claim 32, wherein the domain selection criteria includes cost information associated with processing the subsequent request.

35. The method as recited in claim 25 further comprising obtaining, from the content provider, domain selection criteria, wherein dynamically identifying one or more sets of domains to be utilized in conjunction with the subsequent request is based on the obtained domain selection criteria.

36. The method as recited in claim 25 further comprising:
for each set of domains in the one or more sets of domains:
associating, for each embedded resource of the two or more embedded resources, a domain from the set of domains from which the associated embedded resource will be requested.

37. The method as recited in claim 36, wherein associating, for each embedded resource of the two or more embedded resources, a domain from the set of domains from which the associated embedded resource will be requested comprises translating a resource identifier corresponding to each of the two or more embedded resources such that requests for the two or more embedded resources are directed to the associated domain.

38. The method as recited in claim 25 further comprising providing a recommendation for processing a further subsequent resource request based on a comparison of the performance data associated with processing the first resource request with the performance data associated with processing the subsequent request using each of the identified one or more sets of domains, wherein the further subsequent resource request corresponds to the two or more embedded resources.

39. The method as recited in claim 25, wherein dynamically determining a recommended allocation of domains is further based on the performance data associated with processing the first resource request.

40. The method as recited in claim 25, wherein dynamically determining a recommended allocation of domains is a function of bandwidth.

41. The method as recited in claim 25, wherein dynamically determining a recommended allocation of domains is a function of a threshold number of simultaneous connections to a single domain.

42. The method as recited in claim 25, wherein dynamically determining a recommended allocation of domains is a function of an order of requesting the two or more embedded resources.

43. The method as recited in claim 25, wherein dynamically determining a recommended allocation of domains is a function of two or more of the group comprising: a number of embedded resources corresponding to the request, a size associated with each of the embedded resources corresponding to the request, a bandwidth, a threshold number of simultaneous connections for initiating requests to a single domain, a total number of simultaneous connections regardless of domain, and an order of requesting the two or more embedded resources.

44. The method as recited in claim 25, wherein dynamically determining a recommended allocation of domains is further based on domain selection criteria.

45. The method as recited in claim 44, wherein the domain selection criteria includes quality of service information.

46. The method as recited in claim 44, wherein the domain selection criteria includes cost information associated with processing the subsequent request.

* * * * *

UNITED STATES PATENT AND TRADEMARK OFFICE
CERTIFICATE OF CORRECTION

| | | |
|---|---|---|
| PATENT NO. | : 7,930,393 B1 | Page 1 of 1 |
| APPLICATION NO. | : 12/240863 | |
| DATED | : April 19, 2011 | |
| INVENTOR(S) | : Baumback et al. | |

It is certified that error appears in the above-identified patent and that said Letters Patent is hereby corrected as shown below:

At column 24, line 13, please delete "the" after "on".

Signed and Sealed this
First Day of November, 2011

David J. Kappos
*Director of the United States Patent and Trademark Office*